United States Patent
Au et al.

(10) Patent No.: US 7,852,864 B2
(45) Date of Patent: Dec. 14, 2010

(54) SYSTEM AND METHOD FOR DETECTING AND DIRECTING TRAFFIC IN A NETWORK ENVIRONMENT

(75) Inventors: Andrew Wan-yeung Au, Cupertino, CA (US); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 527 days.

(21) Appl. No.: 11/968,301

(22) Filed: Jan. 2, 2008

(65) Prior Publication Data
US 2008/0101391 A1 May 1, 2008

Related U.S. Application Data

(63) Continuation of application No. 10/638,144, filed on Aug. 8, 2003, now Pat. No. 7,327,746.

(51) Int. Cl.
*H04L 12/28* (2006.01)

(52) U.S. Cl. ............... 370/410; 370/400; 370/401; 370/498; 370/529

(58) Field of Classification Search ........... 370/310, 370/310.2, 328, 329, 336, 337, 338, 345, 370/347, 349, 351, 352, 356, 389, 392, 396, 370/400, 401, 409, 410, 442, 443, 464, 465, 370/498, 529
See application file for complete search history.

(56) References Cited

U.S. PATENT DOCUMENTS

| | | |
|---|---|---|
| 5,729,537 A | 3/1998 | Billström ............. 370/329 |
| 5,742,668 A | 4/1998 | Pepe et al. ............. 379/58 |
| 5,793,762 A | 8/1998 | Penners et al. ............. 370/389 |
| 5,915,239 A | 6/1999 | Haavisto et al. ............. 704/275 |
| 5,966,378 A | 10/1999 | Hämäläinen ............. 370/348 |
| 5,987,137 A | 11/1999 | Karppanen et al. ............. 380/28 |
| 6,098,172 A | 8/2000 | Coss et al. ............. 726/11 |
| 6,104,929 A | 8/2000 | Josse et al. ............. 455/445 |
| 6,363,058 B1 | 3/2002 | Roobol et al. ............. 370/310 |
| 6,553,006 B1 | 4/2003 | Kalliokulju et al. ............. 370/310 |
| 6,600,732 B1 | 7/2003 | Sevanto et al. ............. 370/349 |
| 6,748,434 B2 | 6/2004 | Kavanagh ............. 709/224 |
| 7,010,303 B2 | 3/2006 | Lewis et al. ............. 455/445 |
| 7,020,480 B2 | 3/2006 | Coskun et al. ............. 455/466 |
| 7,023,820 B2 | 4/2006 | Chaskar ............. 370/329 |
| 7,054,945 B2 | 5/2006 | Hurtta et al. ............. 709/230 |
| 7,124,102 B2 | 10/2006 | Aune ............. 705/35 |
| 7,170,872 B2 | 1/2007 | Uskela ............. 370/332 |
| 7,185,114 B1 | 2/2007 | Hariharasubrahmanian . 709/250 |
| 2002/0181448 A1 | 12/2002 | Uskela et al. ............. 370/352 |

*Primary Examiner*—Pankaj Kumar
*Assistant Examiner*—Mark A Mais
(74) *Attorney, Agent, or Firm*—Baker Botts L.L.P.

(57) ABSTRACT

A method for detecting and directing traffic in a network environment is provided that includes receiving a packet included within a communication flow that is initiated by a mobile terminal and setting a flag within the packet. The method further includes directing the packet to a next destination by recognizing that the flag included within the packet was set and therefore is associated with a mobile-to-mobile communication session.

20 Claims, 1 Drawing Sheet

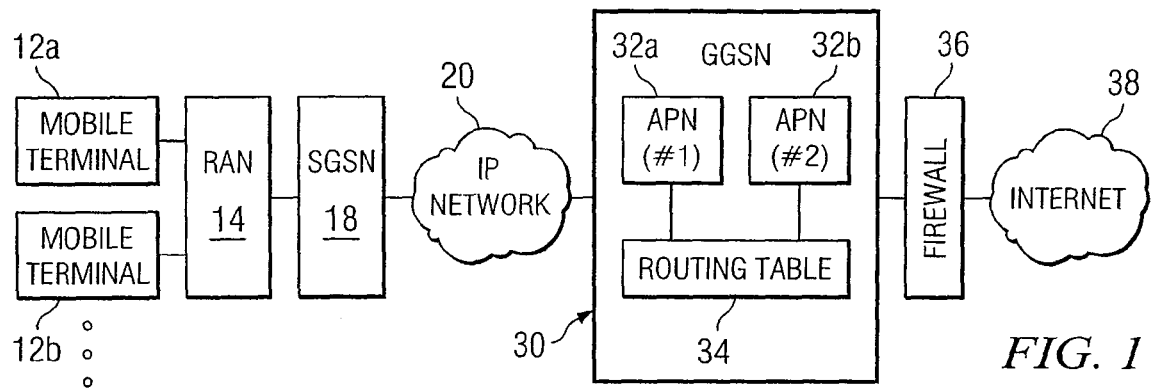
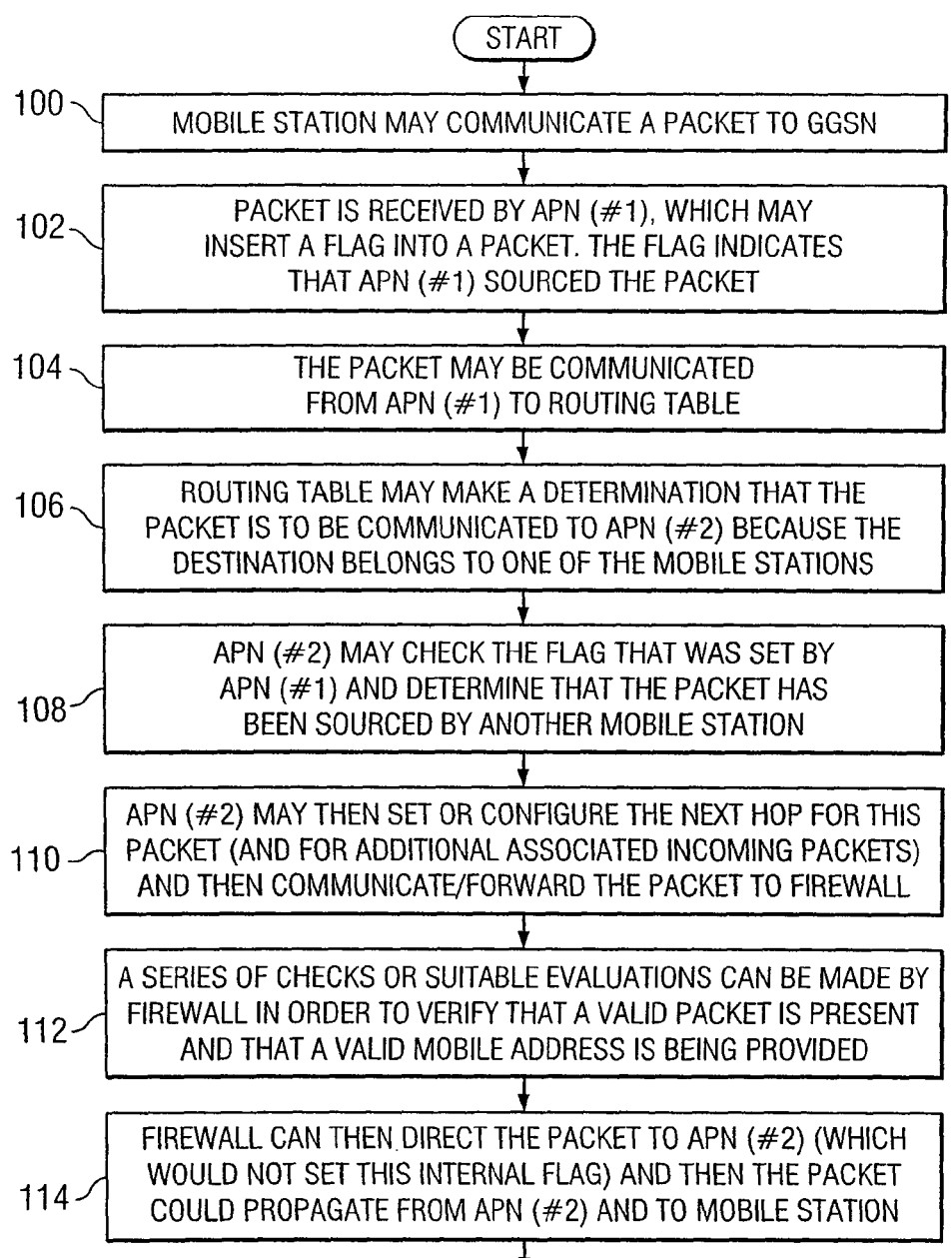

SYSTEM AND METHOD FOR DETECTING AND DIRECTING TRAFFIC IN A NETWORK ENVIRONMENT

CROSS-REFERENCE TO RELATED APPLICATION

This application is a continuation of U.S. application Ser. No. 10/638,144 filed Aug. 8, 2003 and entitled "System and Method for Detecting and Directing Traffic in a Network Environment".

TECHNICAL FIELD OF THE INVENTION

This invention relates in general to the field of communications and, more particularly, to a system and method for detecting and directing traffic in a network environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish a communication flow, whereby an end user or an object may initiate a tunneling protocol by invoking a selected location or a designated network node. The network node or selected location may then provide a platform that the end user may use to conduct a communication session.

As the subscriber base of end users increases, proper routing, viable security, and efficient management of communication sessions and data flows becomes even more critical. In cases where improper routing protocols are executed, certain network components may become overwhelmed or network traffic may be susceptible to breaches in security protocols. This scenario may compromise the validity of communication sessions and inhibit the effective flow of network traffic. Accordingly, the ability to provide an effective mechanism to properly direct communications for an end user/mobile terminal, or to offer an appropriate security protocol for a corresponding network provides a significant challenge to network operators, component manufacturers, and system designers.

SUMMARY OF THE INVENTION

From the foregoing, it may be appreciated by those skilled in the art that a need has arisen for an improved communications approach that provides for more appropriate traffic-routing procedures to achieve optimal data management. In accordance with one embodiment of the present invention, a system and method for detecting and directing traffic in a network environment are provided that greatly reduce disadvantages and problems associated with conventional routing techniques.

According to one embodiment of the present invention, there is provided a method for detecting and directing traffic in a network environment that includes receiving a packet included within a communication flow that is initiated by a mobile terminal and setting a flag within the packet. The method further includes directing the packet to a next destination by recognizing that the flag included within the packet was set and therefore is associated with a mobile-to-mobile communication session.

Note that example implementations of such an architecture do not alter anything in the redirected packet so that devices sitting behind a GGSN can still see its original content. Thus, with respect to the redirection of the intercepted mobile-to-mobile packets to a specified destination, the packets are redirected without their internet protocol (IP) headers being changed. As such, their IP addresses and port numbers would remain the same so that when a firewall (or other network devices) evaluates them, the firewall sees the original unaltered packets.

Certain embodiments of the present invention may provide a number of technical advantages. For example, according to one embodiment of the present invention a communications approach is provided that allows for enhanced security. A security hole may be effectively closed in a corresponding routing protocol. For example, an end user conducting mobile-to-mobile traffic may generate a communication flow that is effectively directed to a firewall instead of being looped within a GGSN. Such a routing process would eliminate the potential breach in security that is present when APNs direct traffic such that a firewall is bypassed entirely. Additionally, such a routing protocol could have other powerful applications such as prohibiting mobile-to-mobile traffic from being effectuated. Moreover, the redirection capability may allow any receiving element or piece of network equipment (i.e. the next hop destination) to process a packet in any suitable manner before returning it to a receiving mobile terminal. Such additional scenarios could include processing that is related to billing, authentication, accounting, statistics-gathering, load-balancing, or any other suitable operation or process.

Another technical advantage associated with one embodiment of the present invention is the result of the flexibility provided by the communications approach. Minimal overhead is incurred as a result of a modification to a given APN architecture. In addition, such an add-on functionality may be configured separately under each APN such that the APNs can have significant control and, hence, sell such a service to mobile subscribes separately. It is also noteworthy that such an implementation could be applicable to legacy systems where such a feature would be beneficial. Numerous systems and architectures could be readily upgraded to accommodate such a routing protocol. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communication system for detecting and directing traffic in a network environment in accordance with one embodiment of the present invention; and FIG. 2 is a flowchart illustrating a series of example steps associated with a method for detecting and directing traffic in a network environment.

DETAILED DESCRIPTION OF EXAMPLE EMBODIMENTS OF THE INVENTION

FIG. 1 is a simplified block diagram of a communication system 10 for communicating data in a network environment.

Communication system 10 includes multiple mobile terminals 12a and 12b, a radio access network (RAN) 14, a serving general packet radio service (GPRS) support node (SGSN) 18, and an internet protocol (IP) network 20. Additionally, communication system 10 may include a gateway GPRS support node (GGSN) 30, which may include an access point name element (APN #1) 32a, an APN element (#2) 32b, and a routing table 34. The designations for each APN as '#1' and '#2' are arbitrary and have been provided for purposes of teaching only. Their designations do not connote any system of priority, hierarchy, or any other network characteristic. Communication system 10 may also include a firewall 36 and an Internet 38.

FIG. 1 may be generally configured or arranged to represent a 2.5 G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes routing operations. This may be inclusive of first generation, 2G, and 3G architectures that provide features for executing appropriate routing decisions.

In accordance with the teachings of the present invention, communication system 10 provides a platform that allows for the ability to detect mobile-to-mobile traffic on a given egress APN (i.e. an APN that represents the return path for traffic). Communication system further provides a way to redirect such traffic to a specific destination of redirection configured for the particular APN. Such a functionality may work with both the IP and point to point protocol (PPP) types of GTP traffic. In general, when a given end user of either mobile terminal 12a or 12b communicates a packet for propagation downstream to a GTP tunnel, GGSN 30 is able to detect if it originated from another GTP tunnel (i.e. a mobile-to-mobile packet). This detection does not introduce any significant performance impact to GGSN 30 in receiving and communicating GTP traffic. When such traffic is detected on an egress APN, GGSN 30 redirects it to an IP destination that is configured as the destination of the redirection for this particular APN. This may be done without changing the packet's source and destination IP addresses (and/or port numbers). The packet is redirected with its original headers of IP (and any layers above the headers) substantially unaltered. Such a functionality is configurable at the APN level so that each given APN can have its own setting. As described in more detail below, communication system 10 provides for mobile-to-mobile redirection on GGSN 30 in order to improve the security of the GPRS network and to enable the APN to control its reception of mobile-to-mobile traffic as needed.

Communication system 10 offers a communications approach that allows for a significant enhancement to network security. A vulnerable security gap may be closed for a corresponding routing protocol. For example, an end user conducting mobile-to-mobile traffic may generate a communication flow that is effectively directed to firewall 36 instead of being looped within GGSN 30. Such a routing process would eliminate the potential breach in security that is present when APNs direct traffic such that firewall 36 is bypassed entirely. Additionally, such a routing protocol could have other powerful applications such as prohibiting mobile-to-mobile traffic from being conducted. Moreover, the redirection capability may allow any receiving element or piece of network equipment (i.e. the next hop destination) to process a packet in any suitable manner before returning it to a receiving mobile terminal. Such additional scenarios could include processing related to billing, authentication, accounting, load-balancing, switching, statistics-gathering, or any other suitable operation or process.

It is also critical to note that communication system 10 offers considerable flexibility for any architecture. Minimal overhead is incurred as a result of a modification to a given APN structure. In addition, such an add-on functionality may be configured separately under each APN such that the APNs can have the control and sell such a service to mobile subscribes separately. It is also noteworthy that such an implementation could be applicable to legacy systems where such a feature would be beneficial. Numerous systems and architectures could be readily upgraded to accommodate such a routing protocol.

For purposes of teaching, it is helpful to provide some overview of the way in which an APN functions. (Note that the terms 'APN' and 'APN element' may be used interchangeably herein in this document.) This description is offered for purposes of example only and should not be construed in any way to limit the principles and features of the present invention. An APN generally identifies a packet data network (PDN) that is configured on (and accessible from) a GGSN. An access point is identified by its APN name. For example, the GSM standard (3.03) defines the following two parts of an APN: 1) APN network identifier; and 2) APN operator identifier.

The name of an access point in the form of an APN network identifier corresponds to the fully-qualified name in the domain name system (DNS) configuration for that network, and it also matches the name specified for the access point in the GGSN configuration. The GGSN may also uniquely identify an APN by an index number. The APN operator identifier is generally an optional name that consists of the fully-qualified DNS name, with the suffix ".gprs."

The access points that are supported by the GGSN are preconfigured on the GGSN. When an end user requests a connection in the GPRS network, the APN is included in the create packet data protocol (PDP) request message. The create PDP request message is a GTP message that establishes a connection between the SGSN and the GGSN. An APN has several attributes associated with its configuration that define how users can access the network at that entry point. By configuring an APN, control can be achieved for how users access the network through the APN entry point. Some of the attributes that can be specified include parameters to define whether authentication is required for access to the PDN, to charge or bill gateway servers, and to identify IP addresses for dynamic host configuration protocol (DHCP) or remote authentication dial-in user service (RADIUS).

Mobile terminals 12a and 12b each represent an end user, a client, or a customer wishing to initiate a communication in communication system 10 via IP network 20. Mobile terminals 12a and 12b may be inclusive of devices used to initiate a communication, such as a computer, a personal digital assistant (PDA), a laptop or an electronic notebook, a telephone, a, or any other device, component, element, or object capable of initiating voice or data exchanges within communication system 10. Mobile terminals 12a and 12b may also be inclusive of a suitable interface to the human user, such as a microphone, a display, a keyboard, or other terminal equipment (such as for example an interface to a personal computer or to a facsimile machine in cases where mobile terminals 12a and 12b are used as a modem). Mobile terminals 12a and 12b may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between mobile terminals 12a and 12b and SGSN 18. RAN 14 may also be representative of terminal equipment (TE) (and accordingly these terms may be used interchangeable herein in this document) used to offer a communications platform to one or more mobile terminals 12a and 12b. RAN 14 may comprise a base transceiver station and a base station controller. The communications interface provided by RAN 14 offers connectivity and allows data to be exchanged between mobile terminals 12a and 12b and any number of selected elements within communication system 10. RAN 14 may also facilitate the delivery of a request packet generated by mobile terminals 12a and 12b and the reception of information sought by mobile terminals 12a and 12b. RAN 14 is only one example of a communications interface between mobile terminals 12a and 12b and SGSN 18. Other types of communications interfaces may be used for a desired network design and based on particular needs.

SGSN 18 and GGSN 30 may cooperate in order to facilitate a communication session involving mobile terminals 12a and 12b. GGSN 30 is a communications or network node that may be working in conjunction with multiple SGSNs 18 to provide a communications medium in a GPRS service network environment in communicating data exchanges within communication system 10. GGSN 30 may also be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple Internet communication protocols and may enable existing IP, X.25, or any other suitable applications or platforms to operate over GSM connections.

In one embodiment, GGSN 30 includes APN (#1) 32a and APN (#2) 32b, both of which may be suitably coupled to routing table 34. It is also important to note that GGSN 30 may include an additional interface (e.g. an APN) that may be used to direct communications to firewall 36 and to Internet 38. Each of APN (#1) 32a and APN (#2) 32b includes software operable to facilitate the traffic routing techniques in accordance with the teachings of one embodiment of the present invention. This software may properly interface with routing table 34 such that a communication flow is properly directed to its appropriate next destination. Alternatively, GGSN 30 may include any suitable hardware, algorithms, devices, components, elements, or objects operable to effectuate the traffic routing operations as described herein.

IP network 20 represents a series of points or nodes of interconnected communication paths for receiving and transmitting packets of information that propagate through communication system 10. IP network 20 offers a communicative interface between mobile terminals 12a and 12b and GGSN 30 and may be representative of a GPRS service provider or any suitable local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention; however, IP network 20 may alternatively implement any other suitable communications protocol for transmitting and receiving data or information within communication system 10. In certain scenarios, GTP may be used as a tunneling protocol on top of UDP/IP where appropriate.

Firewall 36 is a piece of network equipment that is capable of evaluating or inspecting a packet (or an entire communication flow) in order to determine if the information is valid, the information is in its proper format, and/or the information is being rerouted to an appropriate next destination. Firewall 36 represents a next hop destination in accordance with the teachings of the present invention. Alternatively, firewall 36 may be replaced with a router, a switch, a loadbalancer, a bridge, a gateway, or any other suitable element operable to perform some processing or routing operation for an incoming packet. The use of a firewall has been offered for purposes of example only in one application that involves security measures. Other applications may include instances where mobile-to-mobile communications may be effectively eliminated or restricted by redirecting packets in a specific manner.

Internet 38 represents a public internet that offers a communicative interface for GGSN 30 to direct information to mobile terminals 12a and 12b and may be any LAN, WLAN, MAN, WAN, VPN, Intranet or any other appropriate architecture or system that facilitates communications in a network environment. Internet 38 implements a UDP/IP communication language protocol in a particular embodiment of the present invention. However, Internet 38 may alternatively implement any other suitable communication protocol for transmitting and receiving data or information within communication system 10. Additionally, Internet 38 may interface with any additional element or object in order to facilitate proper data management where appropriate and based on particular needs.

In operation of an example flow, mobile terminal 12a may communicate some traffic via SGSN 18. The packets may be destined for some Internet location such that an end user of mobile terminal 12a can receive some Internet data in response to the data flow. The packets may be received at GGSN 30, which may properly divert or direct the information to firewall 36. Such a scenario reflects standard or normal traffic flow in the network, whereby an Internet destination is sought by a given end user.

In the case of mobile-to-mobile traffic flows, the routing of traffic is different. For purposes of this example flow, APN (#1) 32a may be thought of as an ingress APN, whereby APN (#2) 32b may be viewed as an egress APN because it represents the return path for the traffic. (Note that either APN may be defined as providing an egress or an ingress from/to GGSN 30.) Additionally, routing table 34 may be coupled to an interface (not illustrated) that directs traffic from GGSN 30. Such an interface may be representative of an egress APN that directs packets to its appropriate next destination.

Traffic may be received by either APN objects (APN (#1) 32a or APN (#2) 32b) and then be communicated to routing table 34. In cases where the destination address reflects a standard IP address, traffic would leave GGSN 30 and be received at firewall 36. However, if packets reflect mobile-to-mobile traffic, whereby mobile terminal 12a is communicating with mobile terminal 12b, then the traffic flow is altered such that the packets leave GGSN 30 and be directed to firewall 36. Without such an alteration as provided by communication system 10, in a case where APN (#1) 32a is serving mobile terminal 12a and APN (#2) 32b is serving mobile terminal 12b, routing table 34 would direct the traffic flow within GGSN 30 only and, thereby, create a loop within GGSN 30. This loop would create a security vulnerability for the communication flow. In such a case, firewall 36 is bypassed such that it is not included in the above-identified flow. Such problems are addressed by the configuration of GGSN 30.

The new configuration provided in each APN (#1) 32a and APN (#2) 32b allows each APN to detect or identify mobile-to-mobile traffic and respond to this identification by sending the packet from GGSN 30 to a given IP next hop. In the example case of FIG. 1, the next hop is provided as firewall 36. Thus, a certain destination is being provided for mobile-to-mobile traffic. In other applications, firewall 36 could be replaced with a router, a switch, a gateway, a loadbalancer, or any other piece of network equipment operable to perform some operation on an incoming packet.

In general, APN (#1) 32a may insert a flag into a packet that it receives. The flag may indicate that APN (#1) 32a sourced the packet. At this point, APN (#1) 32a does not necessarily know that the communication flow is part of a mobile-to-mobile session. The packet may leave APN (#1) 32a and arrive at routing table 34. Routing table 34 may make a determination that the packet should be (eventually) communicated to APN (#2) 32b because the destination belongs to one of the mobile terminals. APN (#2) 32b may check the original flag that was set by APN (#1) 32a and determine that the packet has been sourced by another mobile terminal. Thus, where the flag is set, a given APN can identify that the corresponding traffic is not standard Internet traffic and, instead, is associated with mobile traffic. APN (#2) 32b is therefore the 'decision-maker' in such an example arrangement. APN (#2) 32b may then set or configure the next hop for this packet (and for additional associated incoming packets) and then communicate/forward the packet to firewall 36. In other alternative scenarios, APN (#2)32b may readily send this packet to routing table 34.

A series of checks or suitable evaluations can then be made at firewall 36 in order to verify that a valid packet is present and that a valid mobile address is being provided. Firewall 36 can then direct the packet to APN (#2) 32b (which would not set this internal flag) and then the packet would propagate from APN (#2) 32b and on to mobile terminal 12b. Thus, the new configuration provided in each APN (#1) 32a and APN (#2) 32b allows mobile-to-mobile sessions to be detected and directed to an appropriate next destination based on particular needs. It is important to note that the implementation of communication system 10 does not alter anything in the redirected packet so that devices sitting behind GGSN 30 can still see its original content. Thus, with respect to the redirection of the intercepted mobile-to-mobile packets to a specified destination, the packets are redirected without their IP headers being changed. As such, their IP addresses and port numbers would remain the same so that when firewall 36 (or other network devices) evaluates them, firewall 36 sees the original unaltered packets.

GGSN 30 provides the ability to redirect such traffic for some APNs and to do direct routing for others. GGSN 30 is able to redirect mobile-to-mobile sessions on some selective APNs to certain specified destinations. Further, its implementation does not alter anything in the redirected packet so that devices sitting behind GGSN 30 can still see its original content. The low performance impact in its (potential) software (or hardware in other scenarios) design is also beneficial.

Before such an implementation, mobile-to-mobile traffic could get switched within GGSN 30 without going through any firewalls or charging/billing gateways on the network side. This loophole enables an attacker to bypass firewalls, to attack other attached mobile subscribers, or to bypass being charged for a given communication flow. The features of communication system 10 operate to detect the traffic flow and force the flow to propagate out of GGSN 30 first before it may be re-routed back downstream toward its recipients. This ensures the firewalls and charging gateways an opportunity to act on such traffic before it is sent to its appropriate next destination.

FIG. 2 is a simplified flowchart illustrating a series of example steps associated with a method for detecting and directing traffic in a network environment. The method begins at step 100 where mobile terminal 12a may communicate a packet to GGSN 30. For purposes of this example, the packet reflects a mobile-to-mobile communication that involves mobile terminal 12b. The packet may be received by APN (#1) 32a, which may insert a flag into a packet at step 102. The flag indicates that APN (#1) 32a sourced the packet.

At step 104, the packet may be communicated from APN (#1) 32a to routing table 34. At step 106, routing table 34 may make a determination that the packet is to be communicated to APN (#2) 32b because the destination belongs to one of the mobile terminals implicated in this example scenario. At step 108, APN (#2) 32b may check the flag that was set by APN (#1) 32a and determine that the packet has been sourced by another mobile terminal (and, thus, indicating a mobile-to-mobile communication). Where the flag is set, a given APN can identify that the corresponding traffic is not standard Internet traffic and, instead, is associated with mobile traffic. APN (#2) 32b is therefore the 'decision-maker' in such an arrangement.

At step 110, APN (#2) 32b may then set or configure the next hop for this packet (and for additional associated incoming packets) and then communicate or forward the packet to firewall 36. A series of checks or suitable evaluations can be made by firewall 36 in order to verify that a valid packet is present and that a valid mobile address is being provided. This is performed at step 112. At step 114, firewall 36 can then direct the packet to APN (#2) 32b (which would not set this internal flag) and then the packet can propagate from APN (#2) 32b and to mobile terminal 12b. Again, it is noteworthy that such a procedure does not alter anything in the redirected packet so that devices sitting behind GGSN 30 can still see its original content. Thus, with respect to the redirection of the intercepted mobile-to-mobile packets to a specified destination, the packets are redirected without their IP headers being changed at all. As such, their IP addresses and port numbers would remain the same so that when firewall 36 (or other network devices) evaluates them, firewall 36 sees the original unaltered packets.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention. It is important to recognize that FIG. 2 illustrates just one of a myriad of potential implementations of communication system 10.

Although the present invention has been described in detail with reference to IP communications, communication system 10 may be used for any tunneling protocol involving routing or redirection of information in a network environment. Any suitable communications that involve mobile communications may benefit from the teachings of the present invention. The use of mobile terminal 12a and IP communications have only been offered for purposes of teaching and should not be construed to limit the scope of the present invention in any way.

In addition, communication system 10 may be extended to any scenario in which mobile terminal 12a is provided with some communication capability (in the context of a wired or a wireless connection or coupling) and, further communicates with some type of access server (e.g. a network access server (NAS), foreign agents, etc.). Mobile terminal 12a may use a dedicated connection of some form or use forms of multiple access protocols where appropriate. Access may be associated with PPP or alternatively with layer three protocols over an L2 layer in accordance with particular needs. Such an embodiment may include any suitable tunnel terminators and/or tunnel initiators.

Moreover, although the present invention has been described with reference to a number of elements included within communication system 10, these elements may be rearranged or positioned in any appropriate manner to accommodate any suitable routing configurations. In addition, any of these elements may be provided as separate external components to communication system 10 or to each other where appropriate. For example, either APN (#1) 32a or APN (#2) 32b may be provided external to GGSN 30 in a single module or component that is operable to execute the operations of detection and redirection as identified herein. The present invention contemplates great flexibility in the arrangement of these elements as well as their internal components.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for detecting and directing traffic in a network environment, comprising:
    a gateway general packet radio service (GPRS) support node (GGSN) operable to receive a packet, included within a communication flow, that is communicated by a mobile terminal, the GGSN communicating with first and second access point name (APN) elements, wherein the first APN is operable to insert a flag into the packet from the communication flow to signify the packet is associated with a mobile-to-mobile communication session.

2. The apparatus of claim 1, wherein the second APN element is operable to direct the packet to a next destination by recognizing that the flag included within the packet was set and therefore is associated with a mobile-to-mobile communication session.

3. The apparatus of claim 1, wherein the GGSN further comprises a routing table that is coupled to the first and second APN elements and that is operable to facilitate directing of one or more packets included within the communication flow based on an address included within one or more of the packets.

4. The apparatus of claim 3, wherein the routing table directs the packet to a firewall in cases where the communication flow is associated with an Internet destination.

5. The apparatus of claim 1 wherein the first APN element sets the flag in order to indicate that the packet was sourced by the first APN element, the second APN element using the flag to identify the communication flow is associated with the mobile-to-mobile communication session.

6. The apparatus of claim 1, wherein the second APN element provides a next hop destination for the packet in cases where the communication flow is associated with the mobile-to-mobile communication session.

7. The apparatus of claim 1, wherein a firewall can receive the packet and direct the packet to the second APN, which would not set the flag, and then the packet would propagate to the mobile terminal.

8. A method for enlisting one or more end users in a network environment in which traffic direction occurs, comprising:
    enlisting one or more end users in a billing plan associated with network communications;
    generating a bill associated with one or more of the end users, the bill being based on the billing plan; and
    facilitating network communications for one or more of the end users in response to the end users being enlisted in the billing plan, whereby the network communications includes a protocol that comprises:
    receiving a packet included within a communication flow that is initiated by a mobile terminal;
    setting a flag within the packet; and
    directing the packet to a next destination by recognizing that the flag included within the packet was set and therefore is associated with a mobile-to-mobile communication session.

9. The method of claim 8, wherein a first APN element sets the flag in order to indicate that the packet was sourced by a first APN element, and wherein a second APN element uses the flag to identify the communication flow is associated with the mobile-to-mobile communication session.

10. The method of claim 8, further comprising:
    directing one or more packets included within the communication flow based on an address included within one or more of the packets.

11. The method of claim 8, wherein a routing table directs the packet to a firewall in cases where the communication flow is associated with an Internet destination.

12. The method of claim 8, wherein the mobile terminal communicates a request to a serving GPRS support node (SGSN) in order to establish the communication flow.

13. The method of claim 8, further comprising:
    providing a next hop destination for the packet in cases where the communication flow is associated with the mobile-to-mobile communication session.

14. The method of claim 8, wherein a firewall can receive the packet and direct the packet to an APN, which would not set the flag, and then the packet would propagate to the mobile terminal.

15. The method of claim 8, further comprising:
    allocating bandwidth to one or more of the end users based on the billing plan.

16. The method of claim 8, wherein a first APN is operable to insert the flag into the packet from the communication flow to signify the packet is associated with a mobile-to-mobile communication session.

17. The method of claim 8, wherein an APN can configure a next hop destination for subsequent packets associated with the communication flow.

18. The method of claim 8, wherein a firewall receives the packet from an APN and confirms that the packet includes a valid mobile address.

19. The method of claim 8, wherein either a first or a second APN is involved in directing the packet, but not both.

20. The method of claim 8, wherein a first and second APN are provided within the GGSN and the GGSN communicates with an IP network.

* * * * *